(12) United States Patent
Kitatani et al.

(10) Patent No.: US 10,842,310 B2
(45) Date of Patent: Nov. 24, 2020

(54) COOKING APPARATUS

(71) Applicant: SHARP KABUSHIKI KAISHA, Sakai (JP)

(72) Inventors: Kazuya Kitatani, Sakai (JP); Masayuki Iwamoto, Sakai (JP); Manami Kobayashi, Sakai (JP); Rika Nozawa, Sakai (JP); Keisuke Morishita, Sakai (JP); Minoru Tanaka, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 241 days.

(21) Appl. No.: 16/078,402

(22) PCT Filed: Jan. 24, 2017

(86) PCT No.: PCT/JP2017/002356
§ 371 (c)(1),
(2) Date: Aug. 21, 2018

(87) PCT Pub. No.: WO2018/042695
PCT Pub. Date: Mar. 8, 2018

(65) Prior Publication Data
US 2019/0059627 A1    Feb. 28, 2019

(30) Foreign Application Priority Data

Aug. 29, 2016  (JP) .................................. 2016-167321

(51) Int. Cl.
*H05B 1/02*       (2006.01)
*A47J 27/04*     (2006.01)
(Continued)

(52) U.S. Cl.
CPC ........... *A47J 27/04* (2013.01); *A47J 37/0629* (2013.01); *A47J 37/0664* (2013.01); *A47J 37/08* (2013.01);
(Continued)

(58) Field of Classification Search
CPC .... A47J 27/04; A47J 37/0629; A47J 37/0664; A47J 37/08; A47J 37/1266; F24C 7/085;
(Continued)

(56) References Cited

U.S. PATENT DOCUMENTS 5,158,064 A * 10/1992 Willis ..................... A47J 27/04
126/20
5,619,983 A * 4/1997 Smith ..................... A47J 27/16
126/20
(Continued)

FOREIGN PATENT DOCUMENTS

CN        201218542 Y     4/2009
CN        102112811 A     6/2011
(Continued)

OTHER PUBLICATIONS

Notification of Reasons for Refusal issued against Japan Patent Application No. 2017-079950 dated Dec. 26, 2017.
(Continued)

*Primary Examiner* — Mark H Paschall
(74) *Attorney, Agent, or Firm* — ScienBiziP, P.C.

(57) ABSTRACT

The present invention provides a cooking device (1A) which, in a case where food items are cooked consecutively, makes the cooked food items uniform in condition. The cooking device (1A) includes an upper heater (17), a d lower heater (18), a steam supplying section (20), a temperature sensor (27), and a heating control section (31A). The heating control section (31A) controls, based on the temperature measured by the temperature sensor (27), the operations of
(Continued)

the upper heater (17) and the lower heater (18) so that the temperature in a cooking room (14) becomes equal to a given temperature. In a case where the time from the start of a cooking process to the end of the cooking process is divided into a preceding time period and a subsequent time period, the heating control section (31A) suspends the operations of the upper heater (17) and the lower heater (18) while the temperature in the cooking room (14) is higher than a given preceding target temperature (T1) during the preceding time period.

4 Claims, 12 Drawing Sheets

(51) Int. Cl.
  *A47J 37/06*   (2006.01)
  *A47J 37/08*   (2006.01)
  *A47J 37/12*   (2006.01)
  *F24C 15/32*   (2006.01)
  *F24C 7/08*   (2006.01)

(52) U.S. Cl.
  CPC ........... *A47J 37/1266* (2013.01); *F24C 7/085* (2013.01); *F24C 15/327* (2013.01)

(58) Field of Classification Search
  CPC ....... F24C 15/327; H05B 1/02; H05B 1/0261; H05B 1/0266; H05B 3/0076
  USPC ................ 219/494, 497, 492, 483, 486, 474
  See application file for complete search history.

(56) References Cited

U.S. PATENT DOCUMENTS

| | | | |
|---|---|---|---|
| 9,060,523 B1 * | 6/2015 | Buller-Colthurst | A23B 4/033 |
| 2004/0159317 A1 | 8/2004 | Walther et al. | |
| 2011/0146653 A1 | 6/2011 | Kitatani | |
| 2013/0118470 A1 | 5/2013 | Armstrong et al. | |
| 2013/0156906 A1 * | 6/2013 | Raghavan | F24C 7/06 |
| | | | 426/243 |
| 2013/0259455 A1 * | 10/2013 | Schootstra | F22B 1/287 |
| | | | 392/394 |
| 2016/0029841 A1 | 2/2016 | Walker | |
| 2017/0059171 A1 | 3/2017 | Kitayama et al. | |
| 2017/0319006 A1 | 11/2017 | Niizumi | |
| 2018/0235239 A1 * | 8/2018 | Reese | F24C 15/327 |
| 2020/0182481 A1 * | 6/2020 | Bhogal | A23L 5/15 |

FOREIGN PATENT DOCUMENTS

| | | |
|---|---|---|
| CN | 103080654 A | 5/2013 |
| CN | 203226682 U | 10/2013 |
| CN | 103884030 A | 6/2014 |
| CN | 105342490 A | 2/2016 |
| JP | S57-121802 U | 7/1982 |
| JP | H03-164125 A | 7/1991 |
| JP | 2005-077020 A | 3/2004 |
| JP | 2005-077019 A | 3/2005 |
| JP | 2007-093091 A | 4/2007 |
| JP | 2007-132566 A | 5/2007 |
| JP | 2007-232270 A | 9/2007 |
| JP | 2009-250494 A | 10/2009 |
| JP | 2011-047612 A | 3/2011 |
| JP | 2011-163719 A | 8/2011 |
| JP | 2011-243320 A | 12/2011 |
| JP | 2012-052703 A | 3/2012 |
| JP | 2014-211246 A | 11/2014 |
| JP | 2015-135235 A | 7/2015 |
| JP | 2016-031156 A | 3/2016 |
| TW | I382827 B | 1/2013 |
| WO | 2016/117667 A1 | 7/2016 |

OTHER PUBLICATIONS

Co-pending letter regarding a related application which the U.S. Appl. No. 16/078,236.

Co-pending letter regarding a related application which the U.S. Appl. No. 16/073,129.

Non-Final Office Action dated May 6, 2020 for U.S. Appl. No. 16/073,129.

* cited by examiner

FIG. 14

|  | WEIGHT CHANGE PERCENTAGE (%) |
|---|---|
| FIRST CYCLE | 96.0 |
| SECOND CYCLE | 94.1 |
| THIRD CYCLE | 94.7 |
| FOURTH CYCLE | 94.7 |
| FIFTH CYCLE | 94.6 |

COOKING APPARATUS

TECHNICAL FIELD

The present invention relates to a cooking device for cooking food items.

BACKGROUND ART

Among various conventional cooking devices, there has been known a cooking device in which steam is supplied to bread while the bread is being heated by a heater, so as to allow toasted bread to have a soft texture (see, for example, Patent Literature 1). Specifically, according to a configuration disclosed in Patent Literature 1, (i) bread placed on a receiving plate is heated in a state of being pressed against a heating plate in which a heater is embedded and (ii) when heating of the bread is about to finish, steam is supplied between the heating plate and the receiving plate by a steam generating device.

In general households, toaster ovens have been widely used as a cooking device for toasting bread. Such a toaster oven has a thermal cut-off function to prevent an excessive increase in temperature in the cooking room of the toaster oven. According to the thermal cut-off function, the operation of a heater is suspended when the temperature in the cooking room becomes equal to or higher than a given temperature.

CITATION LIST

Patent Literature

Patent Literature 1
Japanese Patent Application Publication Tokukaihei No. 3-164125 (1991) (Publication date: Jul. 16, 1991)

SUMMARY OF INVENTION

Technical Problem

However, in a case where food items are cooked consecutively in a cooking device, the temperature in the cooking room of the cooking device is already high at the start of the second or subsequent cooking process. Therefore, in a case where the cooking device has the thermal cut-off function, the thermal cut-off function is prone to be activated in a short white after the start of the second or subsequent cooking process. This poses an issue that it is necessary to wait to start the second or subsequent cooking process until the temperature in the cooking room is decreased.

Meanwhile, in a case where, during the second or subsequent cooking process, (i) the thermal cut-off function is not activated hut (ii) a food item is cooked for the same cooking time as that set for the first cooking process, the food item is undesirably overheated during the second or subsequent cooking process because the temperature of the food item is abruptly increased. For example, in a case where slices of bread are toasted consecutively under the condition where the cooking time set for the second or subsequent cooking process is equal to that set for the first cooking process, water contained in the slice of bread is excessively evaporated during the second or subsequent cooking process. This poses an issue that the bread toasted by the second or subsequent cooking process differs in condition from that of the bread toasted by the first cooking process.

The present invention was accomplished in view of the above issues, and an object of the present invention is to provide a cooking device capable of cooking food items consecutively in a manner that makes the cooked food items uniform in condition.

Solution to Problem

In order to attain the above object, a cooking device in accordance with an aspect of the present invention includes: a heating section configured to heat a food item placed in a cooking room of the cooking device; a steam supplying section configured to supply, in a case where time from a start of a cooking process to an end of the cooking process is divided into a preceding time period and a subsequent time period, steam to the cooking room during the preceding time period; a temperature measuring section configured to measure a temperature in the cooking room; and a heating control section configured to control, based on the temperature measured by the temperature measuring section, operation of the heating section so that the temperature in the cooking room becomes equal to a given temperature, the heating control section suspending the operation of the heating section while the temperature in the cooking room is higher than a given preceding target temperature during the preceding time period.

Advantageous Effects of Invention

An aspect of the present invention brings about an effect of providing a cooking device capable of cooking food items consecutively in a manner that makes the cooked food items uniform in condition.

BRIEF DESCRIPTION OF DRAWINGS

FIG. 14 is a table indicating the weight change percentage of bread toasted by each cooking process in the example of the present invention.

DESCRIPTION OF EMBODIMENTS

Embodiment 1

The following description will discuss a cooking device 1A in accordance with Embodiment 1 with reference to FIGS. 1 to 4.

(Configuration of Cooking Device 1A)

Figure 1:
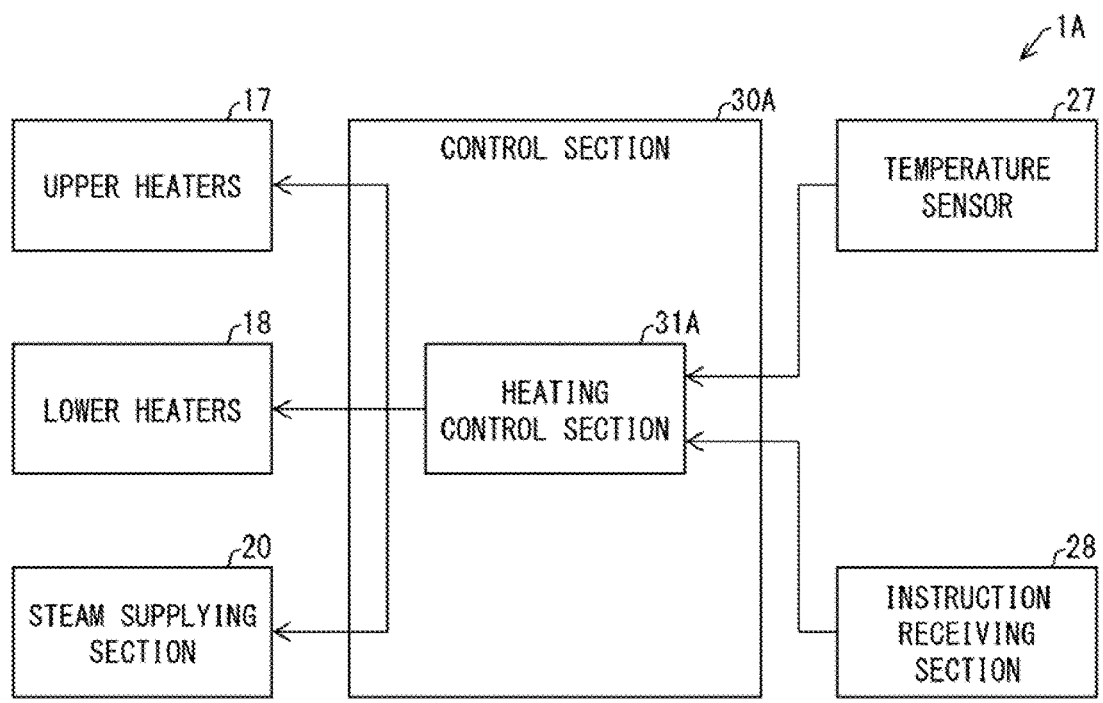
FIG. 1 is a block diagram illustrating a configuration of a cooking device in accordance with Embodiment 1 of the present invention.
Figure 2:
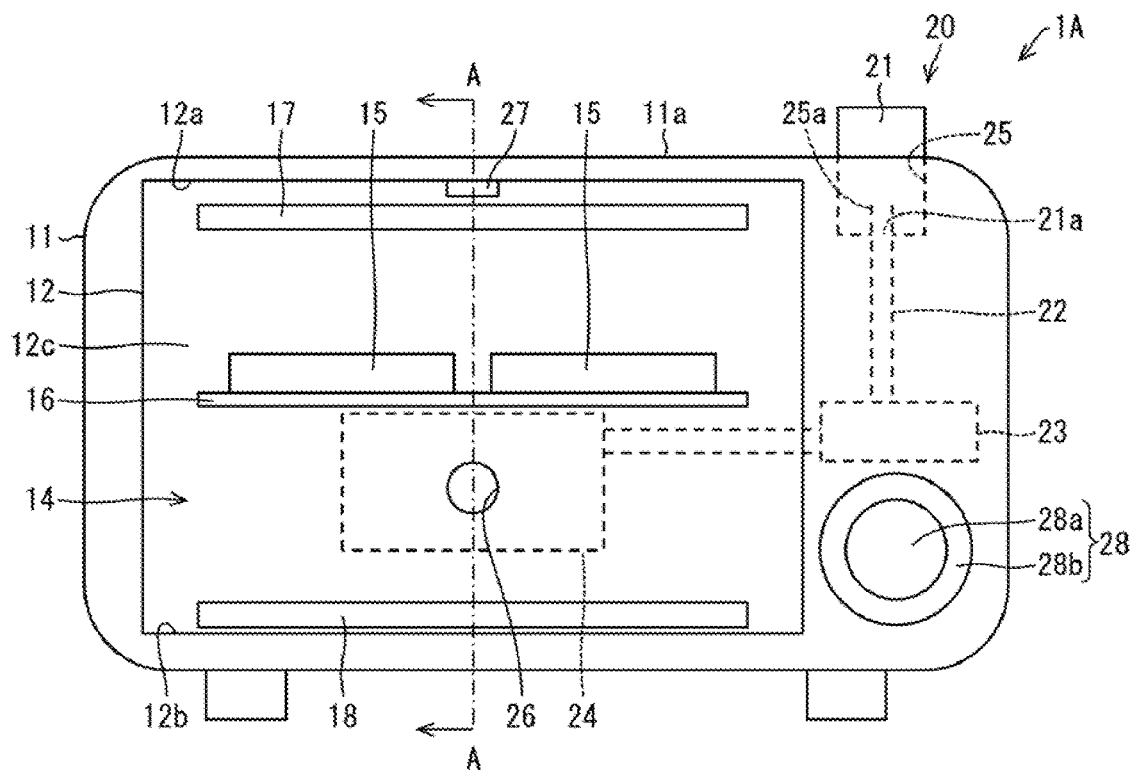
FIG. 2 is an elevational view illustrating the configuration of the cooking device illustrated in FIG. 1.
Figure 3:
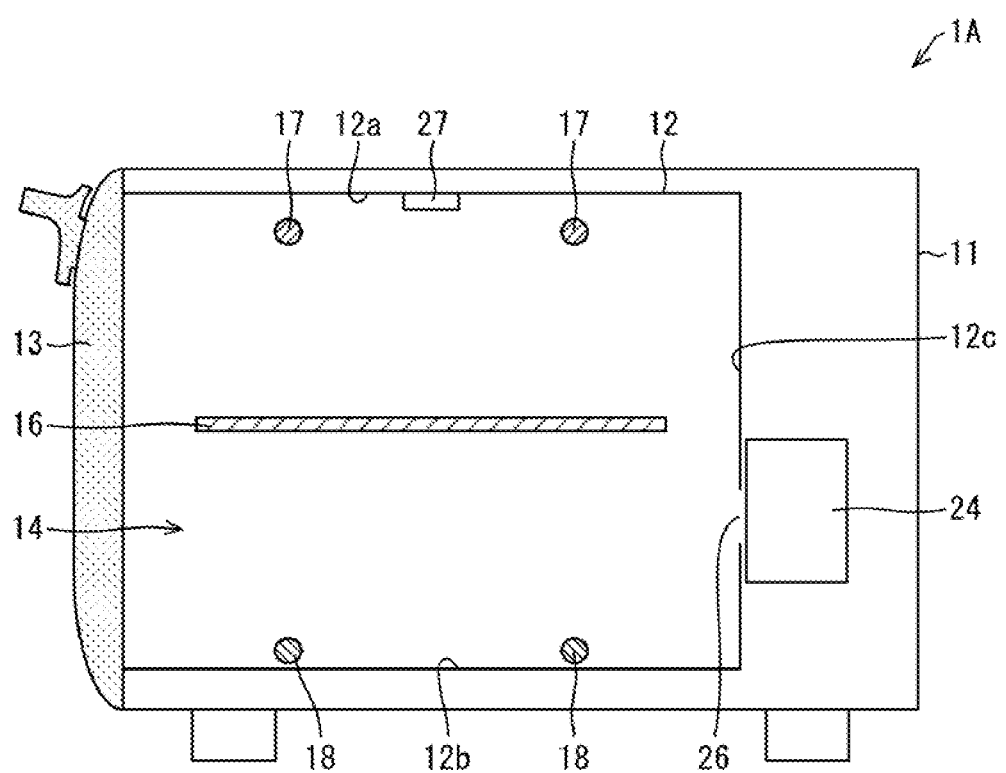
FIG. 3 is a cross-sectional view illustrating the configuration of the cooking device illustrated in FIG. 1, the cross-sectional view being taken along the line A-A indicated in FIG. 2.

A configuration of the cooking device 1A will be discussed below with reference to FIGS. 1 to 3. FIG. 1 is a block diagram illustrating the configuration of the cooking device 1A. FIG. 2 is an elevational view illustrating the configuration of the cooking device 1A. FIG. 3 is a cross-sectional view illustrating the configuration of the cooking device 1A, the cross-sectional view being taken along the line A-A indicated in FIG. 2.

In FIG. 2, a front door 13 is not illustrated for clear illustration of the structure of the cooking device 1A, and part of a steam supplying section 20 is indicated by broken lines.

As illustrated in FIGS. 2 and 3, the cooking device 1A includes (i) an outer wall 11 which constitutes a housing of the cooking device 1A, (ii) an inner wall 12 provided inside the outer wall 11, and (iii) the front door 13 for opening and closing the cooking device 1A. The inner wall 12 and the front door 13 form a space which serves as a cooking room 14 of the cooking device 1A.

In the cooking room 14, a grill 16 is provided on which a food item to be cooked (e.g., bread 15) is to be placed. On the grill 16, for example, two slices of bread 15 can be arranged side by side as illustrated in FIG. 2.

Two upper beaters (heating section, upper heating section) 17 are provided below an upper surface 12a of the inner wall 12 (i.e., in an upper part of the cooking room 14). The upper healers 17 are arranged parallel to each other, and each extend in a lateral direction which is a lengthwise direction of the cooking device 1A (i.e., in a direction in which the slices of bread 15 are arranged). The upper heaters 17 each serve to heat a food item placed in the cooking room 14. In Embodiment 1, the upper heaters 17 are each constituted by a ceramic-based heater in which thermally-tempered, crystallized glass is used.

Two lower heaters (heating section, lower heating section) 18 are provided above a bottom surface 12b of the inner wall 12 (i.e., in a lower part of the cooking room 14). The lower heaters 18 are arranged parallel to each other, and each extend in the lateral direction which is the lengthwise direction of the cooking device 1A (i.e., in the direction in which the slices of bread 15 are arranged). The lower heaters 18 each serves to heat a food item placed in the cooking room 14. In Embodiment 1, the lower heaters 18 are each constituted by a ceramic-based heater. Note that, although the cooking device 1A employs the upper heaters 17 and the lower heaters 18 each constituted by a ceramic-based heater, a cooking device in accordance with an embodiment of the present invention is not limited as such. A cooking, device in accordance with an embodiment of the present invention can alternatively employ upper heaters and lower heaters each constituted by another heating means, such as a sheathed heater.

The cooking device 1A also includes the steam supplying section 20 which serves to supply steam (superheated steam) to the cooking room 14. The steam supplying section 20 includes a water tank 21, a tube 22, a pump 23, a steam generating engine 24, and a water tank housing section 25.

The water tank 21 is a cylindrical tank for storing water from which the steam generating engine 24 generates superheated steam. The water tank housing section 25 is a columnar recess provided on one lengthwise side (i.e., the right side in FIG. 2) of an upper surface 11a of the outer wall 11. The water tank 21 is attachable to and detachable from the water tank housing section 25. The water tank housing section 25 has a cylindrical engagement recess 25a provided at the bottom of the water tank housing section 25. The water tank 21 has an engagement projection 21a provided at the bottom of the water tank 21. The engagement projection 21a serves to engage with the engagement recess 25a. To the engagement recess 25a, the tube 22 is connected via which water is supplied to the steam generating engine 24. The engagement projection 21a is adapted to engage with the engagement recess 25a when the water tank 21 is inserted into the water tank housing section 25.

The pump 23 and the steam generating engine 24 are provided in a space formed between the outer wall 11 and a rear surface 12c of the inner wall 12.

The pump 23 serves to supply water stored in the water tank 21 to the steam generating engine 24 via the tube 22.

The steam generating engine 24 serves to generate superheated steam by heating water supplied from the water tank 21. The steam generating engine 24 includes a heater (not illustrated). The steam generating engine 24 heats supplied water by the heater, and thus generates superheated steam whose temperature is approximately 120° C. to 130° C. The steam generating engine 24 supplies superheated steam thus generated to the cooking room 14 via a steam ejection hole 26, which is provided in the rear surface 12c of the inner wall 12.

The cooking device 1A also includes a temperature sensor (temperature measuring section) 27 provided on the upper surface 12a of the inner wall 12. The temperature sensor 27 is constituted by, for example, a thermistor, and serves to measure the temperature in the cooking room 14. Specifically, the temperature sensor 27 measures the temperature in the cooking room 14, and supplies information on the temperature thus measured to a heating control section 31A (described later). Based on the information supplied from the temperature sensor 27, the heating control section 31A calculates the temperature in the cooking room 14 (i.e., the temperature at the center of the cooking room 14).

The cooking device 1A also includes an instruction receiving section 28 provided on a front surface of the outer wall 11 on a side where the water tank 21 is provided (i.e., the right side in FIG. 2). The instruction receiving section 28 receives a user's instruction with respect to the cooking device 1A. The instruction receiving section 28 includes a round push button 28a and a dial 28b which surrounds the push button 28a. The dial 28b is a member for, when rotated, receiving a user's setting and/or selection (such as cooking time and cooking mode). The push button 28a is a member for, when pushed, receiving a user's decision on, for example, the cooking mode having been selected by the user via the dial 28*b*. The instruction receiving section 28 supplies the user's instruction thus received to the heating control section 31A.

The cooking device 1A also includes a control section 30A (see FIG. 1). The control section 30A is a block for controlling the operation of each section of the cooking device 1A, and is constituted by, for example, a microcomputer or a microprocessor including a central processing unit (CPU). The control section 30A includes the heating control section 31A.

The heating control section 31A controls the operation of the steam supplying section 20. Specifically, upon receipt of a user's instruction for starting a cooking process from the instruction receiving section 28, the heating control section 31A instructs the steam supplying section 20 to supply superheated steam to the cooking room 14 for a given period of time corresponding to, for example, a cooking time set by the user. The given period of time can be set in advance for each cooking mode.

The heating control section 31A also controls the operations of the upper heaters 17 and the lower heaters 18. Specifically, based on the temperature, in the cooking room 14 measured by the temperature sensor 27, the heating control section 31A controls the operations of the upper heaters 17 and the lower heaters 18 so that the temperature in the cooking room 14 becomes equal to, for example, the temperature (target temperature) having been selected by the user via the instruction receiving section 28. The target temperature can be set in advance for each cooking mode.

As described later, the cooking device 1A carries out a cooking process such that, in a case where the time from the start of the cooking process to the end of the cooking process is divided into two time periods (i.e., into a preceding time period and a subsequent time period), the heating control section 31A controls the operations of the upper heaters 17 and the lower heaters 18 so that (i) either the upper heaters 17 or the lower heaters 18 operate during the preceding time period and (ii) the upper heaters 17 and the lower heaters 18 operate simultaneously during the subsequent time period.

(Specific Control by Heating Control Section 31A)

Next, how the heating control section 33A of the cooking device 1A carries out control will be specifically discussed below. The following description will be given on the premise that the time from the start of a cooking process in the cooking device 1A to the end of the cooking process in the cooking device 1A is divided into two time periods (i.e., into a preceding time period and a subsequent time period). During the preceding time period, the heating control section 31A carries out control so that the temperature in the cooking room 14 becomes equal to the target temperature (preceding target temperature T1) set for the preceding time period. During the subsequent time period, the heating control section 31A carries out control so that the temperature in the cooking room 14 becomes equal to the target temperature (subsequent target temperature T2) set for the subsequent time period. The subsequent target temperature T2 is set so as to be higher than the preceding target temperature T1. The preceding target temperature T1 and the subsequent target temperature T2 are set so as to be higher than the temperature of superheated steam to be supplied by the steam supplying section 20. The preceding target temperature T1 and the subsequent target temperature T2 are each set based on the cooking mode and/or the cooking temperature set by the user.

<Preceding Time Period>

The preceding time period is a time period from the start of a cooking process until the lapse of a given period of time.

During the preceding time period, the heating control section 31A controls the steam supplying section 20 to supply superheated steam to the cooking room 14 and controls the upper heaters 17 and the lower heaters 18 so that the temperature in the cooking room 14 becomes equal to the preceding target temperature T1. Note that, during the preceding time period, superheated steam is not necessarily supplied in a continuous manner.

During the preceding time period, superheated steam is supplied to the cooking room 14. This allows heat to be efficiently transmitted to the surface and inside of a food item. Furthermore, the superheated steam supplied to the cooking room 14 condenses on the surface of the food item, and thereby water is supplied to part of the food item. This prevents the food item from being excessively dried. Moreover, in a case where food items are cooked consecutively, supplying superheated steam to the cooking room 14 prevents the food item from being partially overheated during the second or subsequent cooking process. This is because, during the second or subsequent cooking process, part of heat supplied from the upper heaters 17 and the lower heaters 18 serves to heat superheated steam supplied to the cooking room 14. Furthermore, condensation of water on the surface of the food item prevents the food item from being burned.

<Subsequent Time Period>

The subsequent time period is a time period from the end of the preceding time period to the end of the cooking process. During the subsequent time period, the heating control section 31A controls the upper heaters 17 and the lower heaters 18 so that the temperature in the cooking room 14 becomes equal to the subsequent target temperature T2.

During the subsequent time period, the temperature in the cooking room 14 is raised to the subsequent target temperature T2 which is higher than the preceding target temperature T1. This makes it possible to cook a food item in a short time.

Note that the preceding target temperature T1 for the preceding time period and the subsequent target temperature T2 for the subsequent time period are permitted to be changed, provided that the subsequent target temperature T2 is set to be higher than the preceding target temperature T1.

(Cooking Operation of Cooking Device 1A)

Figure 4:
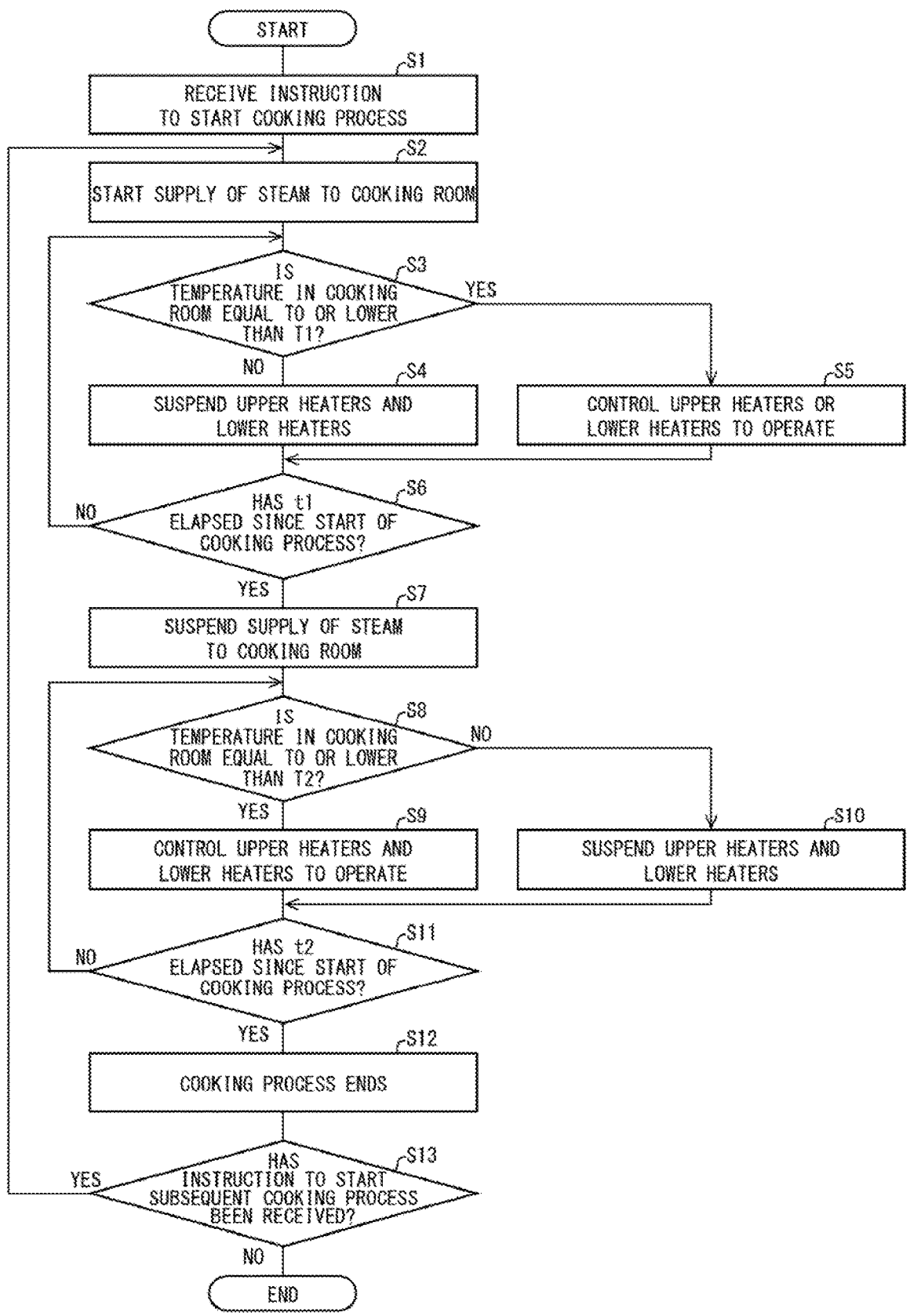
FIG. 4 is a flowchart illustrating how a cooking process is carried out in the cooking device illustrated in FIG. 1.

Next, how the cooking device 1A carries out a cooking process will be discussed below with reference to FIG. 4. FIG. 4 is a flowchart illustrating how the cooking device 1A carries out a cooking process.

Note that (i) the preceding time period of a cooking process in the cooking device 1A corresponds to the steps S2 to S7 in FIG. 4 and (ii) the subsequent time period of the cooking process in the cooking device 1A corresponds to the steps S8 to S12 in FIG. 4. The following description will be given on the premise that (i) the time from the start of the cooking process to the end of the preceding time period is referred to as time t1 and (ii) the time from the start of the cooking process to the end of the subsequent time period (i.e., the time from the start of the cooking process to the end of the cooking process) is referred to as time t2.

The cooking device 1A carries out a cooking process as follows. As illustrated in FIG. 4, upon receipt of a user's instruction for stating a cooking process (S1), the instruction receiving section 28 supplies information on the instruction (e.g., cooking time and/or cooking mode) to the heating control section 31A. Based on the information thus received, the heating control section 31A sets the time t1, the time t2, the preceding target temperature T1, and the subsequent target temperature T2. Note that, before the instruction receiving section 28 receives the instruction for starting a cooking process, the user (i) fills the water tank 21 with water and (ii) inserts the water tank 21 thus filled with water into the water tank housing section 25.

The cooking device 1A is configured to start a cooking process after determining that the dial 28b has not been rotated (i.e., the user has not changed the setting of the cooking time) for a given period of time (e.g., for one second) since the user set the cooking time via the dial 28b. That is, the cooking device 1A is not configured to start a cooking process immediately after the end of rotation of the dial 28b. This allows time for the cooking process to be exactly equal to the time set by the user's instruction.

Subsequently, upon receipt of the instruction for starting the cooking process from the instruction receiving section 28, the heating control section 31A controls the steam supplying section 20 to operate. This causes the pump 23 to operate so as to supply water stored in the water tank 21 to the steam generating engine 24. The water thus supplied is then heated by the heater of the steam generating engine 24. The steam generating engine 94 thus starts the supply of superheated steam to the cooking room 14 (S2).

Subsequently, the heating control section 31A receives, from the temperature sensor 27, information on the temperature in the cooking room 14 measured by the temperature sensor 27, and determines whether the temperature in the cocking room 14 is equal to or lower than the preceding target temperature T1 (S3).

In a case where the temperature in the cooking room 14 is equal to or lower than the preceding target temperature T1 (YES in S3), the heating control section 31A controls either the upper heaters 17 or the lower heaters 18 to operate. More specifically, the heating control section 31A controls the upper heaters 17 and the lower heaters 18 to operate alternately for a certain period of time (e.g., for 10 seconds) (S5).

In contrast, in a case where the temperature in the cooking room 14 is higher than the preceding target temperature T1 (NO in S3), the heating control section 31A suspends the operations of the upper heaters 17 and the lower heaters 18 (S4).

Subsequently, the heating control section 31A determines whether the time t1 has elapsed since the start of the cooking process (S6).

In a case where the time t1 has not elapsed since the start of the cooking process (NO in S6), the heating control section 31A repeats the steps S3 to S5.

In contrast, in a case where the time t1 has elapsed since the start of the cooking process (YES in S6), the heating control section 31A suspends the operation of the steam supplying section 20 so as to suspend the supply of superheated steam to the cooking room 14 (S7). The preceding time period thus ends.

Subsequently, the heating control section 31A receives, from the temperature sensor 27, information on the temperature in the cooking room 14 measured by the temperature sensor 27, and determines whether the temperature in the cooking room 14 is equal to or lower than the subsequent target temperature T2 (S8).

In a case where the temperature in the cooking room 14 is equal to or lower than the subsequent target temperature T2 (YES in S8), the heating control section 31A controls the upper heaters 17 and the lower heaters 18 to operate simultaneously (S9).

In contrast, in a case where the temperature in the cooking room 14 is higher than the subsequent target temperature T2 (NO in S8), the heating control section 31A suspends the operations of the upper heaters 17 and the lower heaters 18 (S10).

Subsequently, the heating control section 31A determines whether the time t2 has elapsed since the start of the cooking process (S11).

In a case where the time t2 has not elapsed since the start of the cooking process (NO in S11), the heating control section 31A repeats the steps S8 to S10.

In contrast, in a case where the time t2 has elapsed since the start of the cooking process (YES in S11), the first cooking process is ended.

Subsequently, in a case where the instruction receiving section 28 receives no instruction for starting a subsequent cooking process (NO in S13), all cooking processes are ended.

In contrast, in a case where the instruction receiving section 28 receives an instruction for starting a subsequent cooking process (YES in S13), the steps S2 to S12 are repeated. Note that, before the subsequent cooking process is started, the user fills the water tank 21 with water.

(Advantages of Cooking Device 1A)

According to the cooking device 1A, superheated steam is supplied to the cooking room 14 during the preceding time period. This allows heat to be efficiently transmitted to the surface and inside of a food item. Furthermore, the superheated steam supplied to the cooking room 14 condenses on the surface of the food item, and thereby water is supplied to part of the food item. This prevents the food item from being excessively dried. Moreover, in a case where food items are cooked consecutively, during the second or subsequent cooking process, part of heat supplied from the upper heaters 17 and the lower heaters 18 serves to heat superheated steam supplied to the cooking room 14. Therefore, in a case where (i) food items are cooked consecutively and (ii) the temperature in the cooking room 14 is high at the start of the second or subsequent cooking process, it is possible to prevent the temperatures of the food items from being excessively increased and thereby prevent the food items from being overheated. Moreover, during the subsequent time period, a food item is cooked at a high temperature by the upper heaters 17 and the lower heaters 18. Therefore, even in a case where the cooking time set for the second or subsequent cooking process is equal to that set for the first cooking process, the food item cooked by the second or subsequent cooking process is similar in condition to the food item cooked by the first cooking process. As such, in a case where food items are cooked consecutively, it is possible to make the cooked food items substantially uniform in condition even when the cooking times are equal.

According to the cooking device 1A, the heating control section 31A suspends the operations of the upper heaters 17 and the lower heaters 18 while the temperature in the cooking room 14 is higher than the given preceding target temperature T1 during the preceding time period. This makes it possible to quickly adjust the temperature in the cooking room 14 to be equal to the preceding target temperature T1 during the preceding time period.

According to the cooking device 1A, the upper heaters 17 and the lower heaters 18 operate alternately during the preceding time period. This makes it possible to (i) cause the temperature in the cooking room 14 to be constant during the preceding time period and (ii) uniformly heat a food item from above and below during the preceding, time period.

According to the cooking device 1A, the upper heaters 17 and the lower heaters 18 are operated simultaneously during the subsequent time period. This makes it possible to (i)

quickly adjust the temperature in the cooking room 14 to be equal to the subsequent target temperature T2 during the subsequent time period and (ii) efficiently cook a food item during the subsequent time period.

According to the cooking device 1A, the heating control section 31A controls the operations of the upper heaters 17 and the lower heaters 18 so that, (i) during the preceding time period, the temperature in the cooking room 14 becomes equal to the preceding target temperature T1, and (ii) during the subsequent time period, the temperature in the cooking room 14 becomes equal to the subsequent target temperature T2 which is higher than the preceding target temperature T1.

According to the above configuration, (i) during the preceding time period, the temperature in the cooking room 14 becomes equal to the preceding target temperature T1 which is lower than the subsequent target temperature T2 at around the end of the cooking process and (ii) during the subsequent time period, the temperature in the cooking room 14 becomes equal to the subsequent target temperature T2 which is higher than the preceding target temperature T1. That is, it is possible to (i) decrease, during the preceding time period, the temperature in the cooking room 14 to the preceding target temperature T1 which is lower than the subsequent target temperature T2 at around the end of the cooking process and (ii) increase, during the subsequent time period, the temperature in the cooking room 14 to the subsequent target temperature T2 at around the end of the cooking process. Therefore, in a case where a plurality of food items are cooked in consecutive cycles, it is possible to efficiently perform cooking which is capable of making the food items cooked in the consecutive cycles substantially uniform in condition even when the cooking times were equal.

According to the cooking device 1A, the steam supplying section 20 supplies superheated steam whose temperature is lower than the preceding target temperature T1. This makes it possible to heat a food item in a state in which the temperature in the cooking room 14 is lower than the preceding target temperature T1.

According to the cooking device 1A, the time (i.e., cooking time) from the start of a cooking process to the end of the cooking process can be fixed. In a case where the cooking time is fixed, the user does not need to check the cooking status of a food item during the cooking process. This makes it possible to provide a cooking device which is highly convenient for users.

Although the cooking device 1A is configured such that no superheated steam is supplied to the cooking room 14 during the subsequent time period, a cooking device in accordance with an embodiment of the present invention is not limited as such. In a case where, for example, a food item is to be cooked for a relatively long period of time (e.g., for 5 minutes or longer) during the subsequent time period, superheated steam can alternatively be supplied to the cooking room 14 in an intermittent manner (e.g., for 2 seconds at intervals of 20 seconds). This makes it possible to (i) prevent a food item from being dried due to evaporation of water contained in the food item and (ii) provide a lower oxygen concentration in the cooking room 14 than usual. This in turn makes it possible to cook a food item under relatively low oxygen condition and thereby prevent the food item from being burned.

Although the cooking device 1A is configured such that the steam supplying section 20 supplies superheated steam to the cooking room 14, a cooking device in accordance with an embodiment of the present invention is not limited as such. A cooking device in accordance with an embodiment of the present invention can alternatively be configured such that a steam supplying section supplies, to the cooking room 14, steam (e.g., steam whose temperature is substantially 100° C.) other than superheated steam.

Embodiment 2

Figure 5:
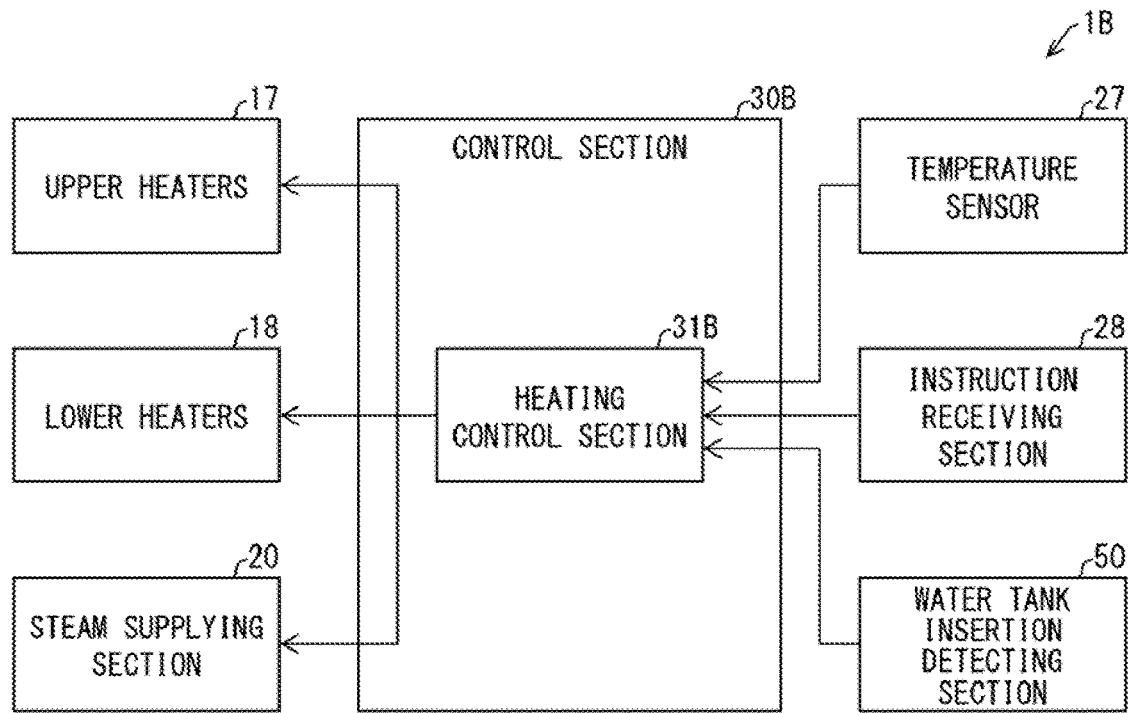
FIG. 5 is a block diagram illustrating a configuration of a cooking device in accordance with Embodiment 2 of the present invention.
Figure 6:
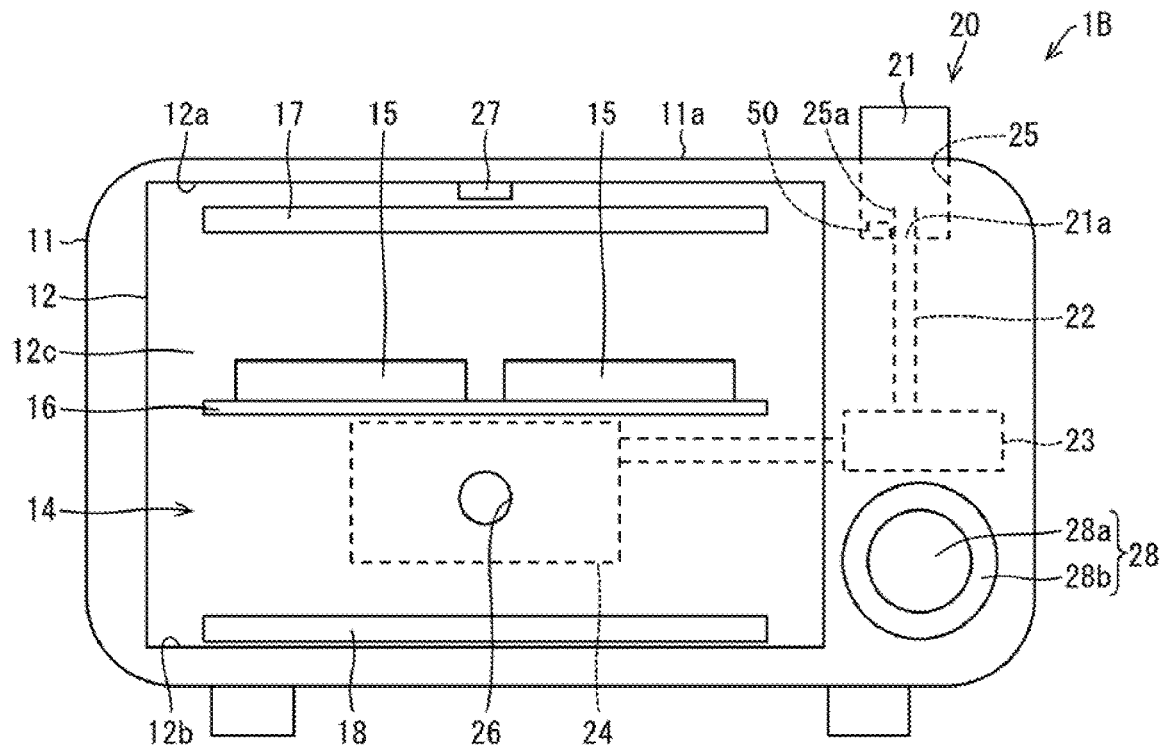
FIG. 6 is an elevational view illustrating the configuration of the cooking device illustrated in FIG. 5.

The following description will discuss Embodiment 2 of the present invention with reference to FIGS. 5 and 6. For convenience, members having functions identical to those of members described in Embodiment 1 are given the same reference signs, and the descriptions thereof are omitted.

Depending on the condition of a cooked food item, the user sometimes wishes to prolong superheated steam-free cooking (i.e., cooking carried out during the subsequent time period). However, the cooking device 1A in accordance with Embodiment 1 is configured such that, after the end of one cooking process, a subsequent cooking process starts with cooking carried out with use of superheated steam. Thus, after the end of one cooking process, only superheated steam-free cooking cannot be additionally carried out.

In view of the above issue, a cooking device 1B in accordance with Embodiment 2 is configured to carry out, upon receipt of a user's instruction for starting a subsequent cooking process after the end of one cooking process, superheated steam-free cooking, provided that a certain condition is satisfied.

(Configuration and Advantages of Cooking Device 1B)

A configuration of the cooking device 1B will be discussed below with reference to FIGS. 5 and 6. FIG. 5 is a block diagram illustrating the configuration of the cooking device 1B. FIG. 6 is an elevational view illustrating the configuration of the cooking device 1B.

As illustrated in FIG. 6, the cooking device 1B further includes a water tank insertion detecting section 50 in addition to the components of the cooking device 1A. Furthermore, as illustrated in FIG. 5, the cooking device 1B includes a control section 30B instead of the control section 30A of the cooking device 1A.

The water tank insertion detecting section 50 is, for example, a switch for detecting a water tank 21 being inserted into a water tank housing section 25 by the user.

The control section 30B includes a heating control section 31B instead of the heating control section 31A of the control section 30A.

The heating control section 31B has the following function in addition to the function of the heating control section 31A in accordance with Embodiment 1. Specifically, the heating control section 31B has a function of controlling the water tank insertion detecting section 50 to detect whether the water tank 21 is inserted in the water tank housing section 25. Furthermore, in a case where an instruction receiving section 28 receives a user's instruction for starting a subsequent cooking process after the end of one cooking process, the heating control section 31B controls a steam supplying section 20 not to operate and controls upper heaters 17 and lower heaters 18 to operate, provided that the following conditions (1) to (3) are satisfied.

Condition (1): A given period of time (e.g., 3 minutes or shorter) lies between the end of the one cooking process to the reception of the instruction for starting a subsequent cooking process.

Condition (2): The temperature in a cooking room 14 is higher than a given temperature.

Condition (3): No attachment or detachment of the water tank 21 is detected during the time from the end of the one cooking process to the reception of the instruction for starting a subsequent cooking process.

The user's instruction given in a state where the above conditions (1) to (3) are satisfied is an instruction for carrying out additional cooking (superheated steam-free cooking) of a food item which has been subjected to one cooking process. Therefore, in a state where the above conditions (1) to (3) are satisfied, the heating control section 31B controls the steam supplying section 20 not to operate and controls the upper heaters 17 and the lower heaters 18 to operate. As such, in a case where the user wishes to prolong superheated steam-free cooking, the cooking device 1B automatically carries out such superheated steam-free cooking, instead of normal cooking (i.e., the cooking carried out with use of superheated steam, as described in Embodiment 1).

Note that, according to the cooking device 1B, the given temperature in the condition (2) is set at approximately 124° C. because of the following reasons (i) and (ii). (i) Assume that a user's instruction for starting a subsequent cooking process is received (a) after 30 seconds or longer since the start of the first cooking process or (b) during the second or subsequent cooking process of consecutive cooking processes. Under such an assumption, the temperature in the cooking room 14 is high even if the user keeps the front door 13 open for 3 minutes, and the cooking of a food item placed in the cooking room 14 has progressed to a certain extent. Therefore, in such a case, superheated steam-free cooking is needed. (ii) Assume that a user's instruction for starting a subsequent cooking process is received within 30 seconds since the start of the first cooking process. Under such an assumption, the temperature in the cooking room 14 is still low, and the cooking of a food item placed in the cooking room 14 has not so progressed yet. Therefore, in such a case, cooking carried out with use of superheated steam is needed.

According to the cooking device 1B, in a case where the water tank insertion detecting section 50 has detected the water tank 21 being inserted in the water tank housing section 25, the heating control section 31B cannot select water draining mode in which (i) water remaining in a tube 22 is sent to a steam generating engine 24 by a pump 23 and (ii) the water thus sent is heated by the steam generating engine 24. In contrast, in a case where the water tank insertion detecting section 50 has detected no water tank 21 being inserted in the water tank housing section 25, the heating control section 31B can select the water draining mode.

Embodiment 3

Figure 7:
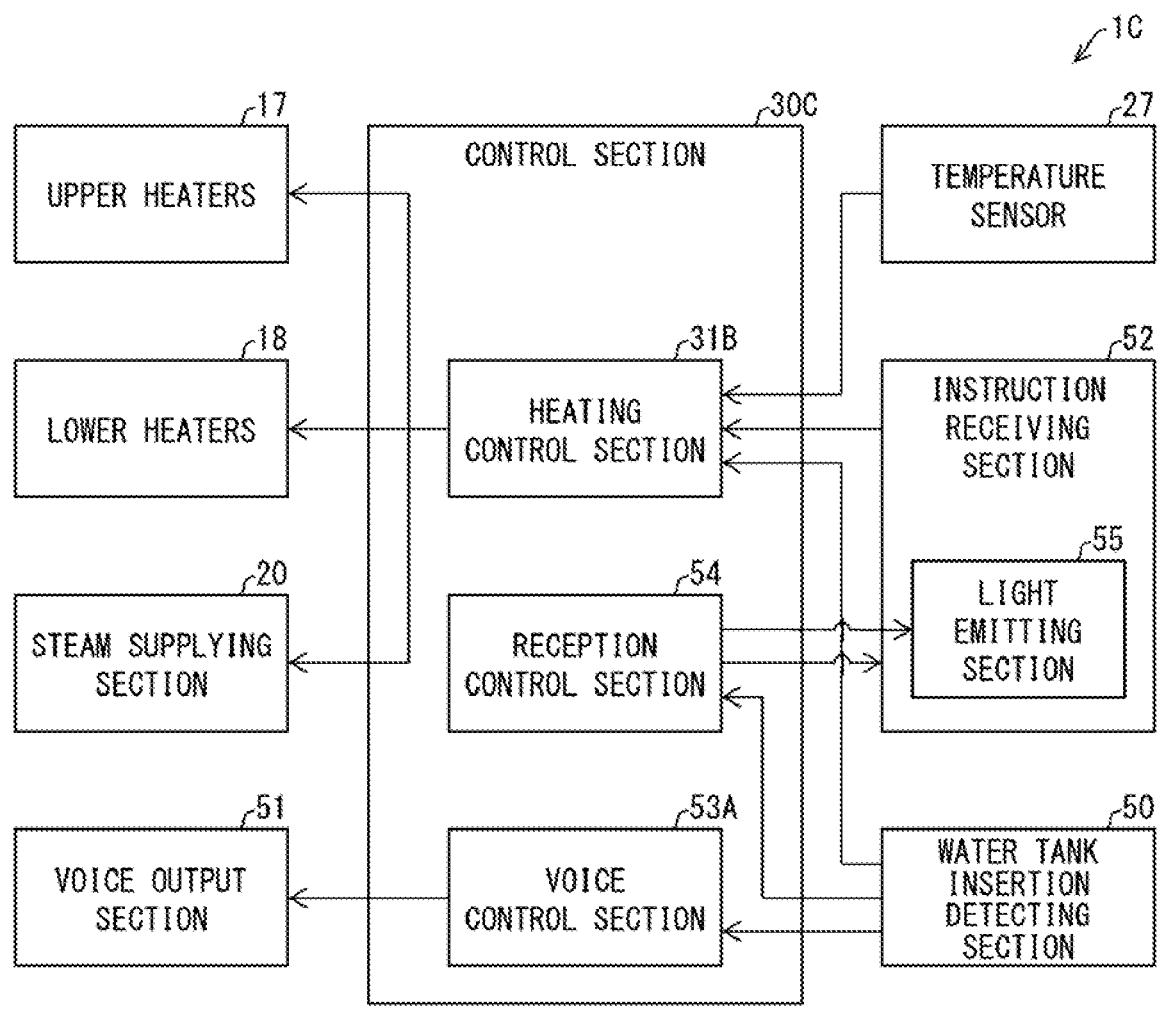
FIG. 7 is a block diagram illustrating a configuration of a cooking device in accordance with Embodiment 3 of the present invention.
Figure 8:
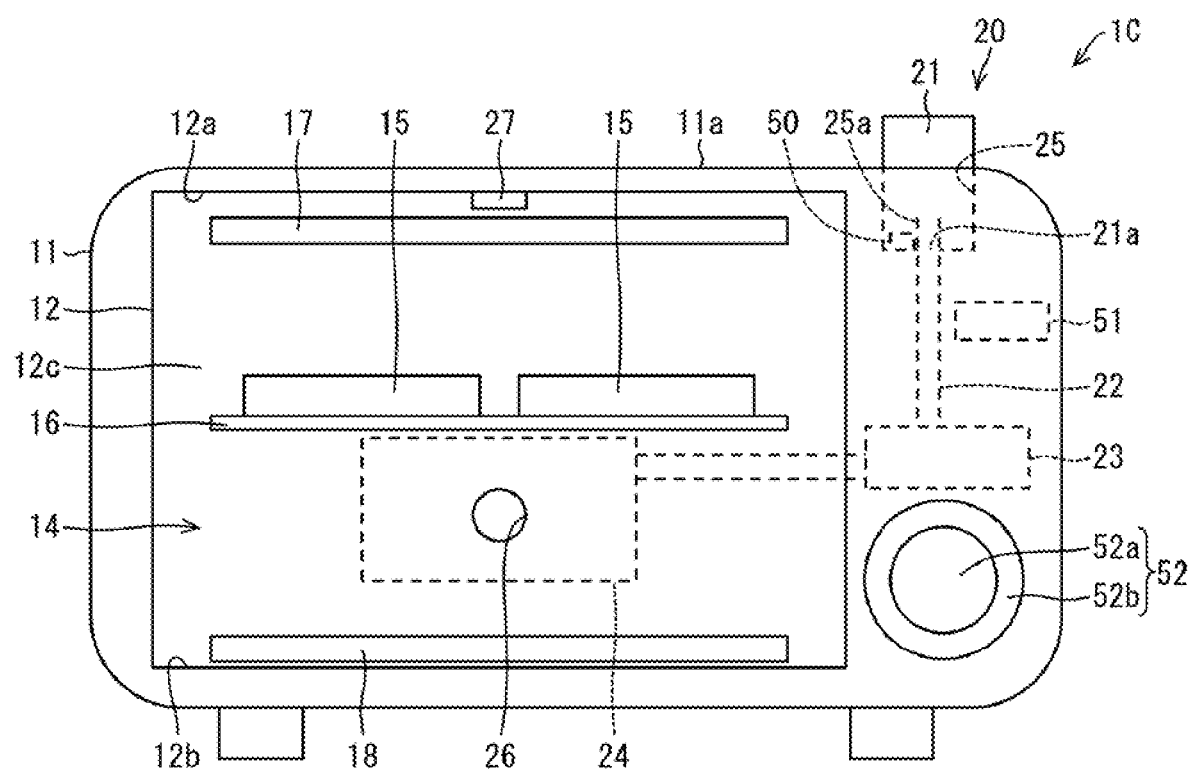
FIG. 8 is an elevational view illustrating the configuration of the cooking device illustrated in FIG. 7.

The following description will discuss Embodiment 3 of the present invention with reference to FIGS. 7 and 8. For convenience, members having functions identical to those of members described in Embodiments 1 and 2 are given the same reference signs, and the descriptions thereof are omitted.

There has conventionally been known a cooking device which includes a door switch for detecting recovery from a cooking suspending slate so as to prevent erroneous operation of the cooking device. According to such a cooking device, when a food item is placed in a cooking room and a door is closed, the door switch detects recovery from the cooking suspending state. This allows the cooking device to receive a user's instruction for starting a cooking process.

However, in order to prevent erroneous operation of a cooking device such as a toaster oven which does not include a door switch, the user needs to perform a plurality of manipulations in the cooking suspending state so as to start a cooking process. This poses an issue that the user feels the plurality of manipulations burdensome.

In view of the above issue, a cooking device 1C in accordance with Embodiment 3 is configured to receive a user's instruction upon detecting a manipulation of inserting a water tank into a water tank housing section.

(Configuration of Cooking Device 1C)

A configuration of the cooking device 1C will be discussed below with reference to FIGS. 7 and 8. FIG. 7 is a block diagram illustrating the configuration of the cooking device 1C. FIG. 8 is an elevational view illustrating the configuration of the cooking device 1C.

As illustrated in FIGS. 7 and 8, the cooking device 1C further includes a voice output section 51 in addition to the components of the cooking device 1B. Furthermore, the cooking device 1C includes an instruction receiving section 52 and a control section 30C, instead of the instruction receiving section 28 and the control section 30B of the cooking device 1B.

The voice output section 51 serves to output a voice (sound).

The instruction receiving section 52 receives a user's instruction with respect to the cooking device 1C. The instruction receiving section 52 includes a round push button 52a, a dial 52b which surrounds the push button 52a, and a light emitting section 55. The light emitting section 55 is constituted by a light emitting element, and is provided in each of the push button 52a and the dial 52b. The light emitting section 55 emits light so as to cause each of the push button 52a and the dial 52b to light up.

The control section 30C includes a voice control section 53A and a reception control section 54 in addition to the components of the control section 30B in accordance with Embodiment 2.

The voice control section 53A controls the voice output section 51 to output, in a case where the water tank insertion detecting section 50 detects a water tank 21 being inserted into a water tank housing section 25, a sound which notifies the user of such a state.

In a case where the water tank insertion detecting section 50 detects the water tank 21 being inserted in the water tank housing section 25, the reception control section 54 permits the instruction receiving section 52 to receive a user's instruction. In such a case, the reception control section 54 controls the light emitting section 55 to emit light so as to cause each of the push button 52a and the dial 52b to light up.

(Advantages of Cooking Device 1C)

According to the cooking device 1C, the instruction receiving section 52 is permitted to receive a user's instruction after insertion of the water tank 21 into the water tank housing section 25. That is, insertion of the water tank 21 into the water tank housing section 25, which insertion is equivalent to a manipulation for using the cooking device 1C, is utilized to permit the instruction receiving section 52 to receive a user' instruction. The configuration allows the cooking device 1C, in which a steam supplying section 20 is utilized to carry out a cooking process, to regard a user's usual manipulation of inserting the water tank 21 into the water tank housing section 25 as a manipulation for preventing erroneous operation of the cooking device 1C. This makes it possible to prevent erroneous operation of the cooking device 1C without the user's feeling of burdensomeness.

When the water tank 21 is inserted into the water tank housing section 25, (i) the voice output section 51 outputs a sound which indicates such a state and (ii) the push button 52a and the dial 52b light up. This makes it possible to make the user aware, through the sound and the indication (light), that the cooking device 1C is ready to receive a user's instruction.

Although the cooking device 1C is configured such that the push button 52a and the dial 52b of the instruction receiving section 52 light up, the cooking device 1C is not limited as such. Alternatively, the cooking device 1C can be configured such that, for example, (i) a light emitting element is provided in a region of an outer wall 11 other than a region in which the instruction receiving section 52 is provided and (ii) the light emitting element lights up.

Note that the cooking device 1C is configured such that the voice output section 51 outputs a notification sound when a plug (not illustrated), via which electric power supplied from an outlet is received, is inserted into the outlet. This makes it possible to make the user aware, through the sound, that the cooking device 1C is powered on.

Embodiment 4

Figure 9:
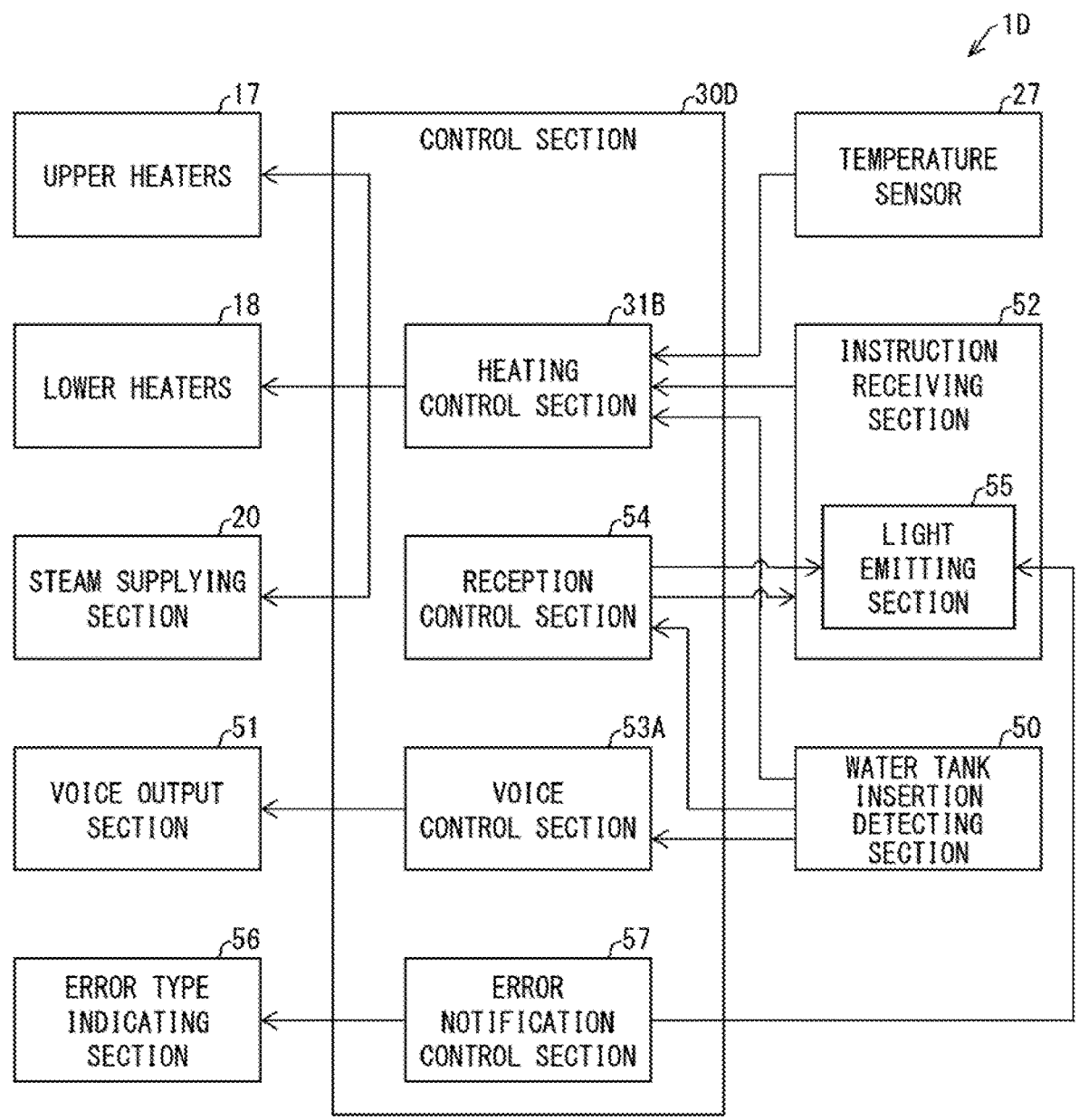
FIG. 9 is a block diagram illustrating a configuration of a cooking device in accordance with Embodiment 4 of the present invention.
Figure 10:
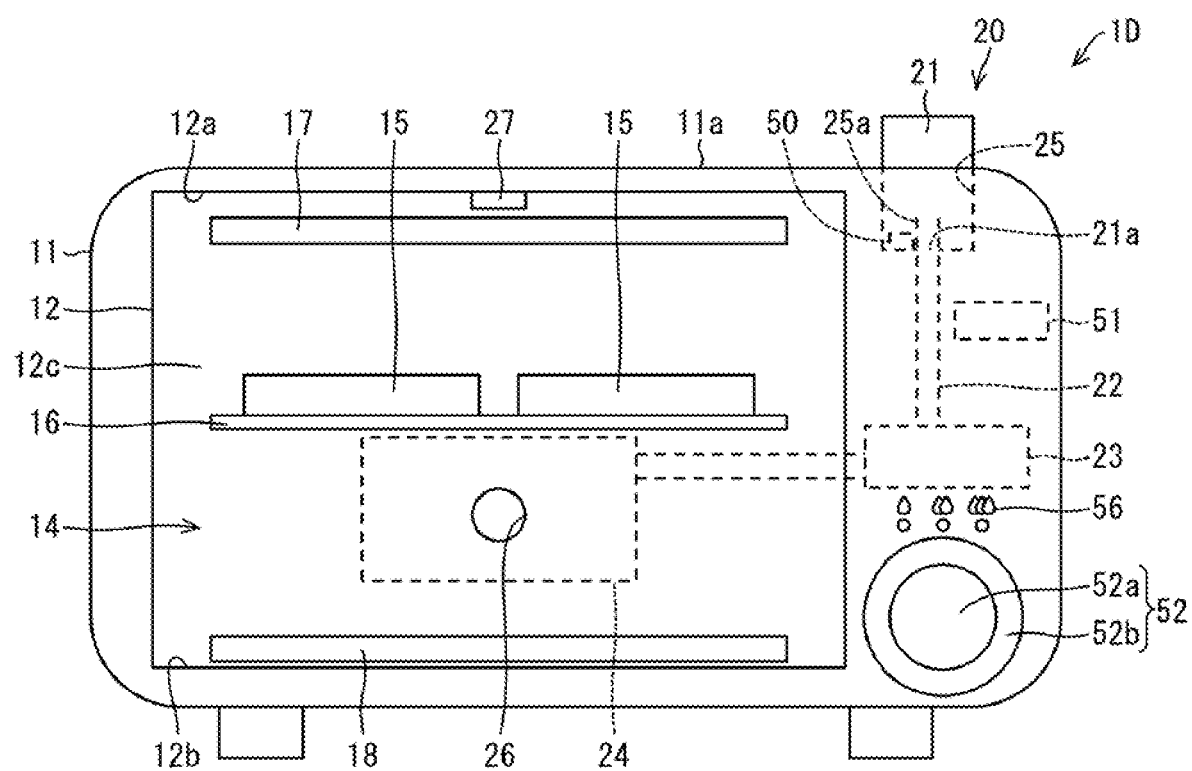
FIG. 10 is an elevational view illustrating the configuration of the cooking device illustrated in FIG. 9.

The following description will discuss Embodiment 4 of the present invention with reference to FIGS. 9 and 10. For convenience, members having functions identical to those of members described in Embodiments 1, 2, and 3 are given the same reference signs, and the descriptions thereof are omitted.

A cooking device 1D in accordance with Embodiment 4 is configured to notify, in a case where an error (trouble) occurs in the cooking device 1D, the user of (i) the occurrence of the error and (ii) the type of the error.

(Configuration and Advantages of Cooking Device 1D)

A configuration of the cooking device 1D will be discussed below with reference to FIGS. 9 and 10. FIG. 9 is a block diagram illustrating the configuration of the cooking device 1D. FIG. 10 is an elevational view illustrating the configuration of the cooking device 1D.

As illustrated in FIGS. 9 and 10, the cooking device 1D includes an error type indicating section 56 in addition to the components of the cooking device 1C. Furthermore, the cooking device 1D includes a control section 30D instead of the control section 30C of the cooking device 1C.

The error type indicating section 56 serves to notify, in a case where an error (trouble) occurs in the cooking device 1D, the user of the type of the error. The error type indicating section 56 includes light emitting diodes (LEDs) (not illustrated) each serving as a light emitting element. Emission of light (lighting) from the LEDs is controlled by an error notification control section 57 (described later). In Embodiment 4, the error type indicating section 56 includes three display sections, and notifies the user of the type of an error through combination of lighting of the three display sections. The number of display sections of the error type indicating section is not limited to three, and can be determined as appropriate in accordance with the number of types of errors to be indicated.

The control section 30D includes the error notification control section 57 in addition to the components of the control section 30C in accordance with Embodiment 3.

Upon detection of an error occurring in a component (e.g., upper heaters 17, lower heaters 18, or steam supplying section 20) of the cooking device 1D, the error notification control section 57 notifies the user of (i) the occurrence of the error and (ii) the type of the error. Specifically, in a case where an error occurs in the cooking device 1D, the error notification control section 57 controls a light emitting section 55 to cause a dial 52b of an instruction receiving section 52 to blink and controls the error type indicating section 56 to light up all or any of the LEDs in correspondence with the type of the error.

According to the cooking device 1D, the error notification control section 57 is configured to control, in a case where an error (trouble) occurs in the cooking device 1D, (i) the dial 52b to blink (in a normal state, the dial 52b is controlled to partially light up in accordance with the cooking time set by the user) and (ii) the error type indicating section 56 to light up all or any of the LEDs in correspondence with the type of the error. This makes it possible to (i) make the user aware of the occurrence of the error and (ii) notify the user of the type of the error.

According to the cooking device 1D, the light emitting section 55 and the error type indicating section 56 each includes a light emitting element. This makes it possible to notify the user of (i) the occurrence of an error and (ii) the type of the error, by a simple configuration without employing a complicated configuration such as a display section (e.g., liquid crystal screen) in which numbers and/or letters can be displayed.

Embodiment 5

Figure 11:
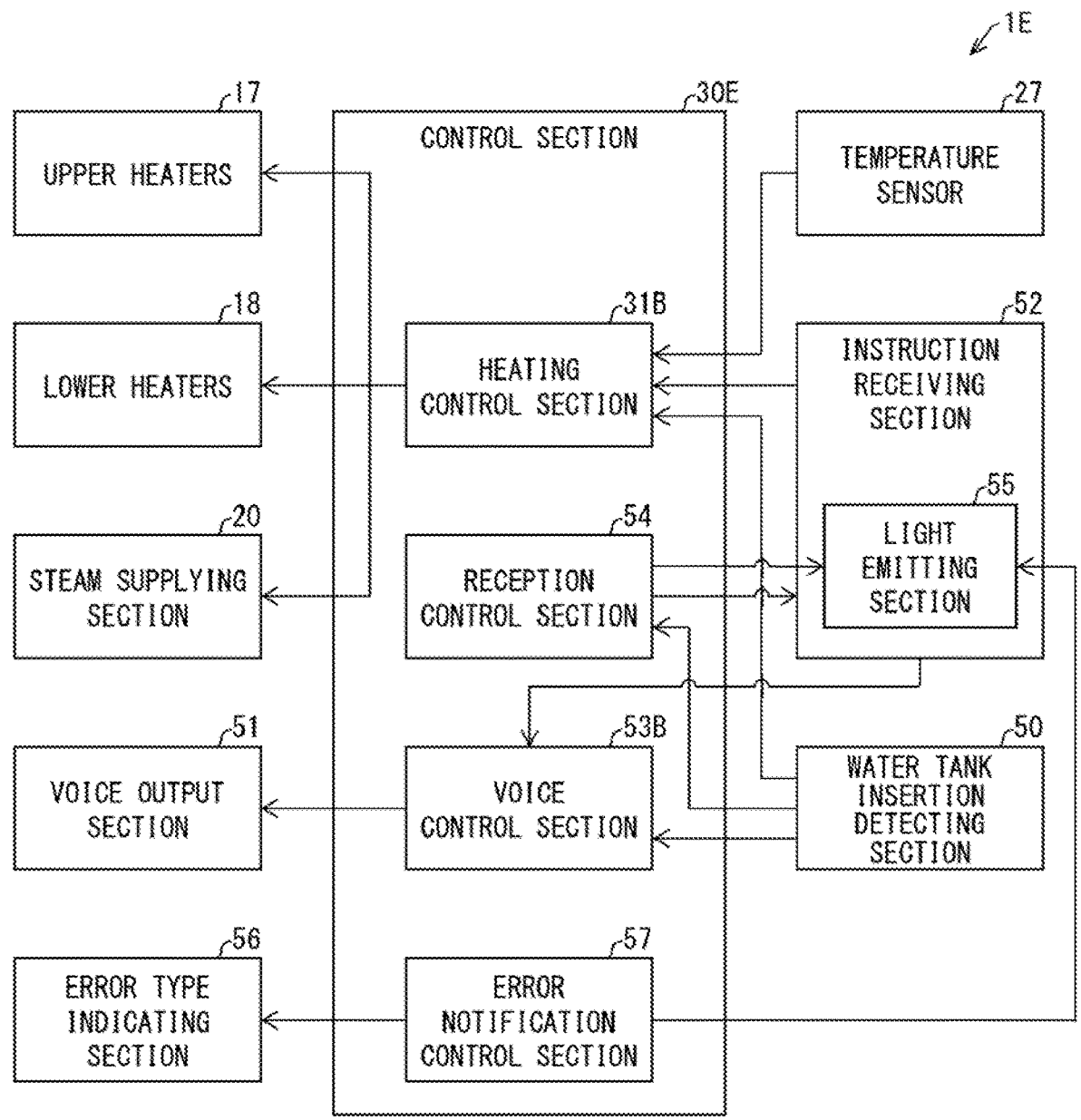
FIG. 11 is a block diagram illustrating a configuration of a cooking device in accordance with Embodiment 5 of the present invention.

The following description will discuss Embodiment 5 of the present invention with reference to FIG. 11. For convenience, members having functions identical to those of members described in Embodiments 1, 2, 3, and 4 are given the same reference signs, and the descriptions thereof are omitted.

A cooking device 1E in accordance with Embodiment 5 is configured such that, while user's selection (such as cooking mode and cooking time) is being inputted via a dial 52b, a voice output section 51 outputs a sound whose pitch corresponds to the rotation position of the dial 52b.

(Configuration and Advantages of Cooking Device 1E)

A configuration of the cooking device 1E will be discussed below with reference to FIG. 11. FIG. 11 is a block diagram illustrating the configuration of the cooking device 1E.

As illustrated in FIG. 11, the cooking device 1E includes a control section 30E instead of the control section 30D of the cooking device 1D in accordance with Embodiment 4. The control section 30E includes a voice control section 53B instead of the voice control section 53A of the control section 30D.

The voice control section 53B has the following function in addition to the function of the voice control section 53A. Specifically, the voice control section 53B has a function of receiving information on user's selection (such as cooking mode and cooking time) having been received by the dial 52b of an instruction receiving section 52, and then controlling the voice output section 51 to output a sound whose pitch corresponds to the information.

The following description will assume an example where the user rotates the dial 52b of the instruction receiving section 52 to select a cooking time. In a case where a cooking time is increased through rotation of the dial 52b, the voice control section 53B instructs the voice output section 51 to output, in accordance with the rotation of the dial 52b, a sound whose pitch is high. In contrast, in a case where a cooking time is decreased through rotation of the dial 52b, the voice control section 53B instructs the voice output section 51 to output, in accordance with the rotation of the dial 52b, a sound whose pitch is low. This makes it possible to make the user aware of the rotation position of the dial 52b (i.e., the setting position of the dial 52b) not only through visual sensation but also through auditory sensation. This also makes it possible to make a visually impaired person aware of how the cooking time is selected.

[Recap]

A cooking device (1A to 1E) in accordance with a first aspect of the present invention includes: a heating section (upper heater 17, lower heater 18) configured to heat a food item placed in a cooking room 14 of the cooking device; a steam supplying section 20 configured to supply, in a case where time from a start of a cooking process to an end of the cooking process is divided into a preceding time period and a subsequent time period, steam to the cooking room 14 during the preceding time period; a temperature measuring section (temperature sensor 27) configured to measure a temperature in the cooking room 14; and a heating control section (31A, 31B) configured to control, based on the temperature measured by the temperature measuring section, operation of the heat section so that the temperature in the cooking room 14 becomes equal to a given temperature, the heating control section (31A, 31B) suspending the operation of the heating section while the temperature in the cooking room 14 is higher than a given preceding target temperature T1 during the preceding time period.

According to the above configuration, steam is supplied to the cooking room during the preceding time period. This allows heat to be efficiently transmitted to the surface and inside of a food item. Furthermore, the steam supplied to the cooking room condenses on the surface of the food item, and thereby water is supplied to part of the food item. Therefore, in a case where (i) food items are cooked consecutively and (ii) the temperature in the cooking room 14 is high at the start of the next or subsequent cooking process, it is possible to prevent the temperatures of the food items from being excessively increased, and thereby prevent the food items from being overheated. The operation of the heating section is suspended while the temperature in the cooking room 14 is higher than the given preceding target temperature T1 during the preceding time period. This makes it possible to quickly decrease the temperature in the cooking room. Moreover, during the subsequent time period, a food item is cooked at a high temperature by the upper heater 17 and the lower heater 18. Therefore, even a case where the cooking time set for the second or subsequent cooking process is equal to that set for the first cooking process, the food item cooked by the second or subsequent cooking process is similar in condition to the food item cooked by the first cooking process. As such, in a case where food items are cooked consecutively, it is possible to make the cooked food items substantially uniform in condition even when the cooking times are equal.

The cooking device (1A to 1E) in accordance with a second aspect of the present invention is preferably configured such that, in the first aspect of the present invention, the heating section includes an upper heating section (upper heater 17) and a lower heating section (lower heater 18), the upper heating section (upper heater 17) being provided in an upper part of the cooking room 14, the lower heating section (lower heater 18) being provided in a lower part of the cooking room 14; and the heating control section (31A, 31B) controls the upper heating section and the lower heating section to operate alternately during the preceding time period.

According to the above configuration, it is possible to cause the temperature in the cooking room to be constant during the preceding time period. During the preceding time period, a large amount of electric power is consumed due to the operation of the steam supplying section. Therefore, by controlling the upper heating section and the lower heating section to operate alternately during the preceding time period, it is possible to prevent electric power consumption from increasing due to simultaneous operations of the steam supplying section, the upper heating section, and the lower heating section.

The cooking device (1A to 1E) in accordance with a third aspect of the present invention is preferably configured such that, in the second aspect of the present invention, the heating control section (31A, 31B) controls the upper heating section and the lower heating section to operate simultaneously during the subsequent time period.

According to the above configuration, the temperature in the cooking room can be quickly increased during the subsequent time period. This makes it possible to efficiently cook a food item.

The cooking device (1A to 1E) in accordance with a fourth aspect of the present invention is preferably configured such that, in any one of the first to third aspects of the present invention, the heating control section (31A, 31B) controls the operation of the heating section so that (i) the temperature in the cooking room 14 becomes equal to the given preceding target temperature T1 during the preceding time period and (ii) the temperature in the cooking room 14 becomes equal to a subsequent target temperature T2 during the subsequent time period, the subsequent target temperature T2 being higher than the given preceding target temperature T1.

According to the above configuration, (i) during the preceding time period, the temperature in the cooking room becomes equal to the given preceding target temperature which is lower than the subsequent target temperature at around the end of the cooking process and (ii) during the subsequent time period, the temperature in the cooking room becomes equal to the subsequent target temperature which is higher than the given preceding target temperature. That is, it is possible to (i) decrease, during the preceding time period, the temperature in the cooking room to the given preceding target temperature which is lower than the subsequent target temperature at around the end of the cooking process and (ii) increase, during the subsequent time period, the temperature in the cooking room to the subsequent target temperature at around the end of the cooking process. Therefore, in a case where a plurality of food items are cooked in consecutive cycles, it is possible to efficiently perform cooking which is capable of making the food items cooked in the consecutive cycles substantially uniform in condition even when the cooking times were equal.

The cooking device (1A to 1E) in accordance with a fifth aspect of the present invention is preferably configured such that, in any one of the first to fourth aspects of the present invention, the steam supplying section 20 supplies steam whose temperature is lower than the given preceding target temperature T1.

According to the above configuration, the steam supplying section supplies steam whose temperature is lower than the given preceding target temperature. This makes it possible to heat a food item in a state in which the temperature in the cooking room is lower than the given preceding target temperature.

The cooking device (1A to 1E) in accordance with a sixth aspect of the present invention can be configured such that, in any one of the first to fifth aspects of the present invention, the time from the start of the cooking process to the end of the cooking process is fixed.

According to the above configuration, since the cooking time is fixed, the user does not need to check the cooking status of a food item during the cooking process. This makes it possible to provide a cooking device which is highly convenient for users.

The present invention is not limited to the above embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

EXAMPLE

Figure 12:
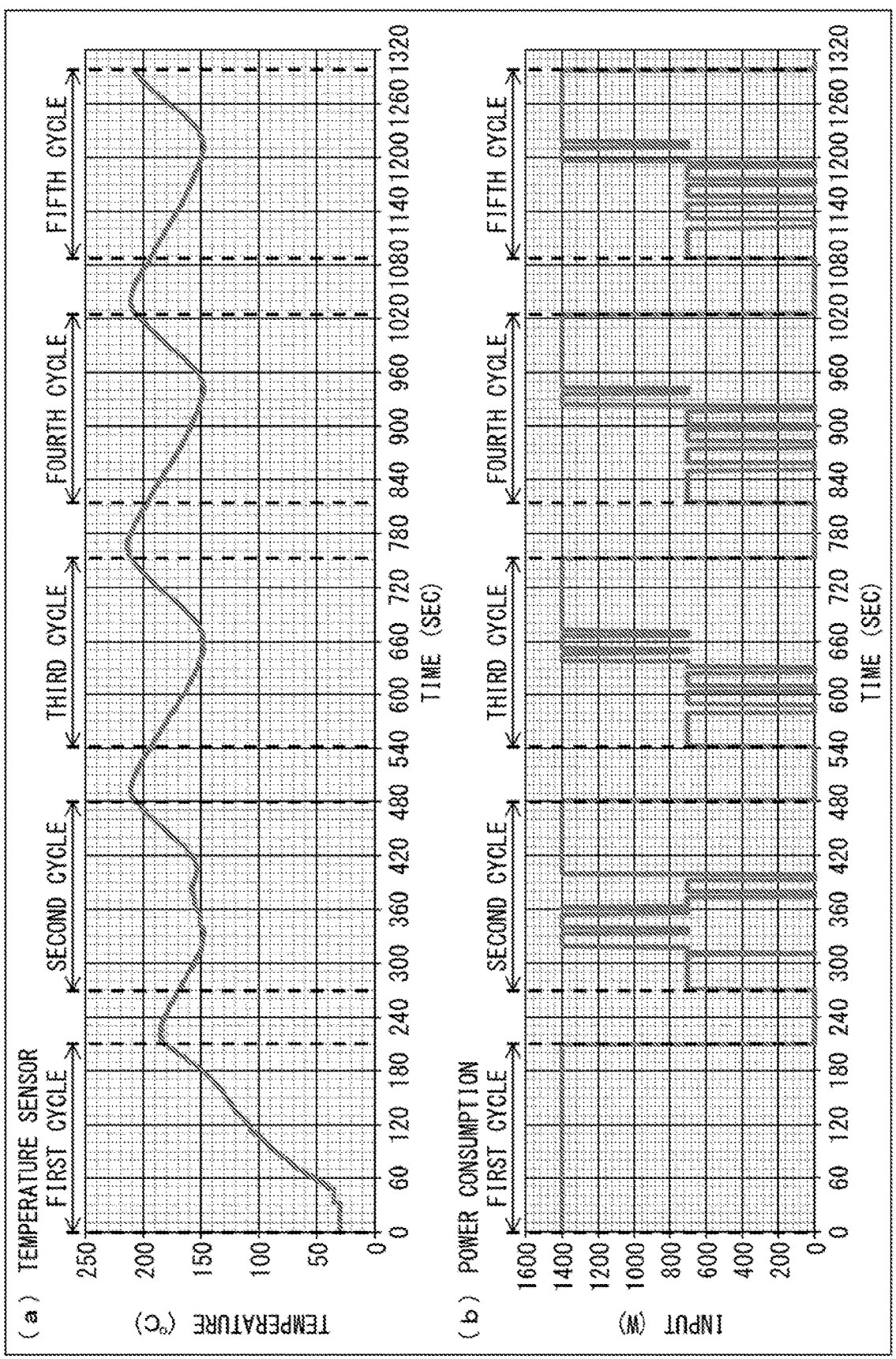
FIG. 12 illustrates how experiments were conducted in an example of the present invention, (a) of FIG. 12 is a graph indicating temperatures measured by a temperature sensor, and (b) of FIG. 12 indicates electric power supplied to a cooking device.
Figure 13:
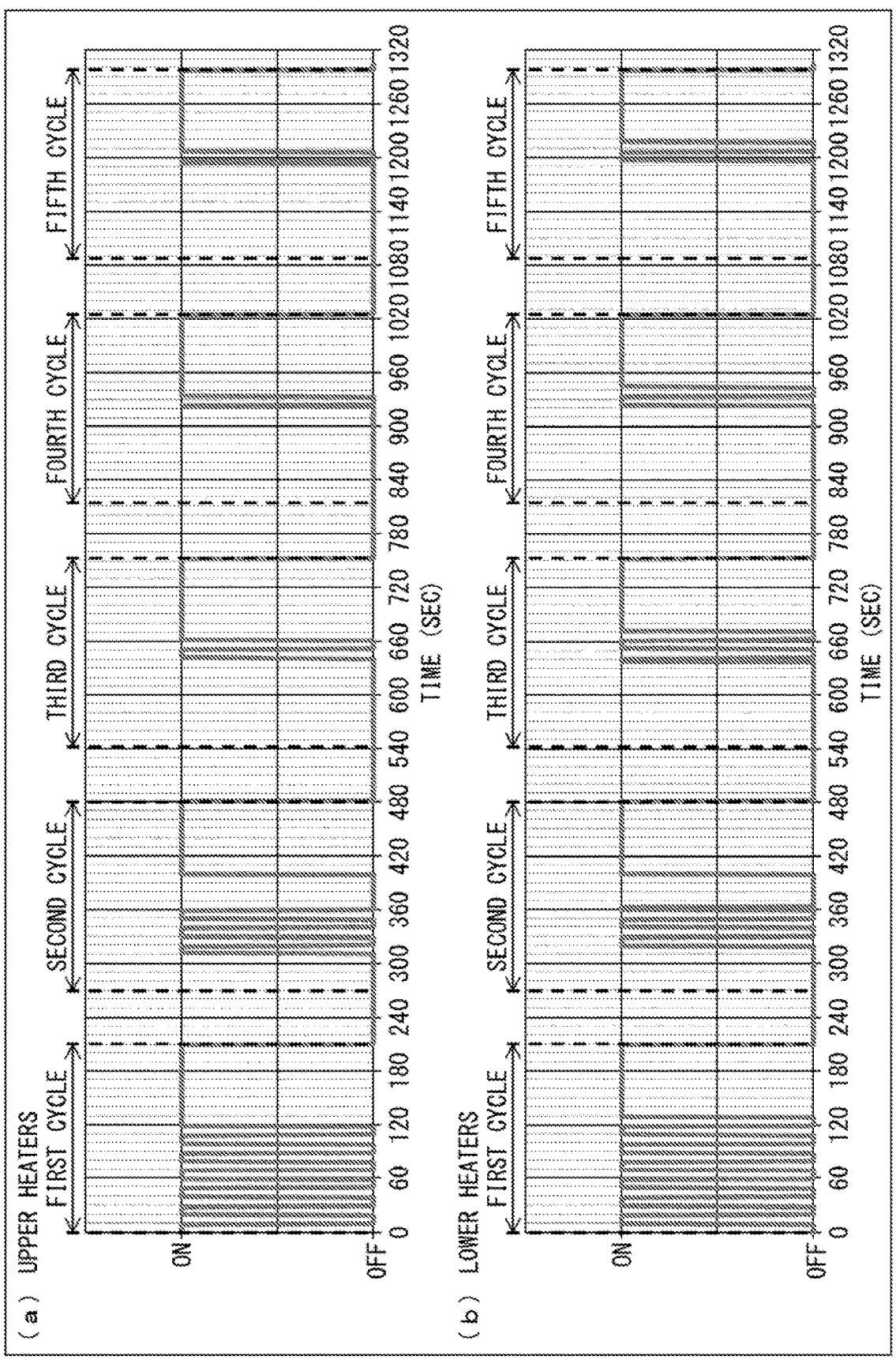
FIG. 13 illustrates how the experiments were conducted in the example of the present invention, (a) of FIG. 13 is a graph indicating ON and OFF of the operation of upper heaters, and (b) of FIG. 13 is a graph indicating ON and OFF of the operation of lower heaters.

The following description will discuss an example of the present invention with reference to FIGS. 12 to 14.

In this example, (i) five cooking processes were consecutively carried out with respect to bread by using a cooking device in accordance with an embodiment of the present invention, and (ii) two slices of bread were cooked in each cooking process. In this example, a cooking device was used which included (i) four ceramic-based heaters each of which produces output of 350 W (two of which served as upper heaters and the other two of which served as lower heaters) and (ii) a steam generating engine with output power of 700 W.

In this example, each of the five cooking processes was carried out under the following conditions.

Preceding target temperature T1: 190° C.
Preceding time period: 130 seconds
Subsequent target temperature T2: 250° C.
Subsequent time period: 80 seconds It follows that (i) the time t1 (described in Embodiment 1) from the start of each cooking process to the end of the preceding time period was 130 seconds and (ii) the time t2 from the start of the cooking process to the end of the subsequent time period (i.e., the time from the start of the cooking process to the end of the cooking process) was 210 seconds. The five cooking processes were carried out at intervals of 60 seconds.

How the experiments were conducted in this example will be discussed below with reference to FIGS. 12 and 13. FIG. 12 illustrates how the experiments were conducted in this example. (a) of FIG. 12 is a graph indicating the temperatures measured by a temperature sensor, and (b) of FIG. 12 is a graph indicating electric power supplied to the cooking device. FIG. 13 illustrates how the experiments were conducted in this example. (a) of FIG. 13 is a graph indicating ON and OFF of the operation of the upper heaters, and (b) of FIG. 13 is a graph indicating ON and OFF of the operation of the lower heaters. Note that the temperatures indicated in (a) of FIG. 12 were each measured in the vicinity of the lateral surface of the cooking device on which lateral surface the temperature sensor was disposed. In a case where the temperature indicated in (a) of FIG. 12 was approximately 150° C., the temperature at the center of the cooking room was approximately 190° C. In a case where the temperature indicated in (a) of FIG. 12 was approximately 210° C., the temperature at the center of the cooking room was approximately 250° C. Note also that (b) of FIG. 12 indicates the total electric power supplied to the cooking device, i.e., the total electric power supplied to the upper heaters, the lower heaters, and the steam generating engine.

<First Cooking Process>

First, the preceding time period (from 0th second to 130th second) of the first cooking process will be discussed below. As illustrated in FIGS. 12 and 13, the temperature in the cooking room was low at the start of the first cooking process. Therefore, during the preceding time period of the first cooking process, a heating control section instructed (i) the steam generating engine to supply superheated steam to the cooking room and (ii) the upper heaters and the lower heaters to operate alternately by being switched therebetween at intervals of a certain period of time (10 seconds). As such, the slices of bread were heated, and water was supplied thereto.

Next, the subsequent time period (from 130th second to 210th second) of the first cooking process will be discussed below. During the subsequent time period of the first cooking process, the heating control section instructed (i) the steam generating engine to suspend its operation and (ii) the upper heaters and the lower heaters to operate simultaneously. As such, the temperature in the cooking room was increased, and heating of the slices of bread was finished.

<Second Cooking Process>

First, the preceding time period (from the 270th second to the 400th second) of the second cooking process will be discussed below. During the early stage (until approximately the 320th second) of the preceding time period of the second cooking process, the temperature in the cooking room was higher than the preceding target temperature (190° C.), and the heating control section thus instructed (i) the upper heaters and the lower heaters to suspend their operations and (ii) the steam generating engine to operate so as to supply superheated steam to the cooking room. Since the temperature of superheated steam supplied to the cooking room was approximately 120° C. to 130° C., the temperature in the cooking was decreased through the supply of the superheated steam to the cooking room. Moreover, water was supplied to the slices of bread through the supply of the superheated steam to the cooking room.

Subsequently, during a time period (from approximately 320th second to the 400th second) after the temperature in the cooking room reached a temperature around the preceding target temperature (190° C.), the temperature in the cooking room was controlled so as to be equal to the preceding target temperature (190 C.). Specifically, when the temperature in the cooking room became equal to or lower than the preceding target temperature (190° C.), the healing control section instructed the steam generating engine to operate and instructed the upper heaters or the lower heaters to operate. In contrast, when the temperature in the cooking room became higher than the preceding target temperature (190° C.), the heating control section instructed the steam generating engine to operate and instructed the upper heaters and the lower heaters to suspend their operations.

Next, the subsequent time period (from the 400th second to the 480th second) of the second cooking process will be discussed below. During the subsequent time period of the second cooking process, the heating control section instructed the steam generating engine to suspend its operation and instructed the upper heaters and the lower heaters to operate simultaneously. As such, the temperature in the cooking room was increased, and heating of the slices of bread was finished.

The third to fifth cooking processes were each carried out in a manner similar to the second cooking process. FIG. 14 is a table indicating the weight change percentage of bread toasted by each cooking process. As indicated in FIG. 14, the weight change percentage of bread toasted by each of the first to fifth cooking processes was approximately 95%. That is, in a case where slices of bread were cooked consecutively, it was possible to make the cooked slices of bread substantially uniform in condition even when the cooking times were equal. The weight change percentage of bread toasted by a conventional toaster oven was approximately 91%. In contrast, the weight change percentage of bread toasted by a cooking device in accordance with an embodiment of the present invention was as high as approximately 95%. The weight change percentage of bread depends on the amount of water contained in the bread. That is, in a case where the weight change percentage of bread is high, the bread contains a large amount of water. It follows that, bread toasted by a cooking device in accordance with an embodiment of the present invention was crispy on the outside (because its surface was sufficiently heated) and chewy on the inside (because it contained a large amount of water inside).

In a case where a food item is to be cooked for a relatively long period of time (e.g., for 5 minutes or longer), steam or superheated steam can be supplied to the cooking room in an intermittent manner (e.g., for 2 seconds at intervals of 20 seconds) because, in such a case, the food item easily gets dry. By supplying steam or superheated steam, it is possible to (i) prevent the food item from getting dry and (ii) provide a lower oxygen concentration in the cooking room than usual. This in turn makes it possible to cook the food item under relatively low oxygen condition.

REFERENCE SIGNS LIST 1A to 1E: Cooking device
14: Cooking room
17: Upper heater (heating section, upper heating section)
18: Lower heater (heating section, lower heating section)
20: Steam supplying section
27: Temperature sensor (temperature measuring section)
31A, 31B: Heating control section
T1: Preceding target temperature
T2: Subsequent target temperature

The invention claimed is:

1. A cooking device, comprising:
  a cooking room;
  an instruction receiving section configured to receive a user's instruction;
  an upper heater configured to supply heat to heat a food item placed in the cooking room, the upper heater being provided so as to be above the food item;
  a lower heater configured to supply heat to heat the food item placed in the cooking room, the lower heater being provided so as to be below the food item;
  a steam supplying section configured to supply steam to the cooking room;
  a temperature sensor configured to measure a temperature in the cooking room; and
  a heating control section configured to control respective operations of the upper heater, the lower heater, and the steam supplying section,
  the heating control section being configured to:
  set, based on the user's instruction that the instruction receiving section has received, (i) a first target temperature, (ii) a second target temperature, and (iii) a cooking time period which includes a first cooking time period and a second cooking time period following the first cooking time period;
  determine whether the first cooking time period has ended;
  control the steam supplying section to supply steam to the cooking room until the first cooking time period ends;
  until the first cooking time period ends, compare the temperature measured by the temperature sensor and the first target temperature, and then, in a case where the temperature measured by the temperature sensor is equal to or lower than the first target temperature, control the upper heater and the lower heater so that the upper heater and the lower heater operate alternately or, in a case where the temperature measured by the temperature sensor is higher than the first target temperature, suspend the respective operations of the upper heater and the lower heater;
  after the end of the first cooking time period, determine whether the second cooking time period has ended; and
  until the second cooking time period ends, compare the temperature measured by the temperature sensor and the second target temperature, and then, in a case where the temperature measured by the temperature sensor is equal to or lower than the second target temperature, control the upper heater and the lower heater so that the upper heater and the lower heater operate simultaneously.

2. The cooking device as set forth claim 1, wherein the heating control section controls the respective operations of the upper heater, the lower heater, and the steam supplying section so that (i) the temperature measured in the cooking room becomes equal to the first target temperature during the first cooking time period and (ii) the temperature measured in the cooking room becomes equal to the second target temperature during the second time period, the second target temperature being higher than the first target temperature.

3. The cooking device as set forth in claim 1, wherein the steam supplying section supplies steam whose temperature is lower than the first target temperature.

4. The cooking device as set forth in claim 1, wherein the cooking time period from a start to an end is fixed.

* * * * *